Figure 1:
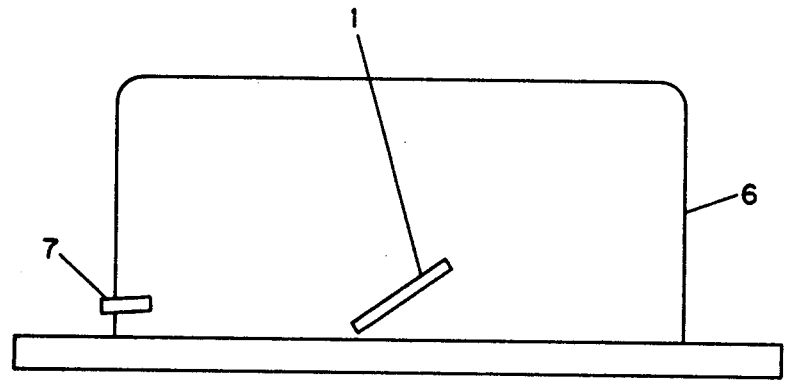

United States Patent [19]

Pettersen

[11] Patent Number: 4,458,988

[45] Date of Patent: Jul. 10, 1984

[54] OPTICAL DISPLAY CELL AND A METHOD FOR ITS MANUFACTURING INCLUDING A GAS CLOUD WITH MONODISPHERES

[75] Inventor: Reidar Pettersen, Drammen, Norway

[73] Assignee: Norsk LCD, Skogar, Norway

[21] Appl. No.: 318,597

[22] Filed: Nov. 5, 1981

[30] Foreign Application Priority Data

Nov. 12, 1980 [NO] Norway ............................ 803399

[51] Int. Cl.$^3$ ............................................. G02F 1/133
[52] U.S. Cl. ......................................................... 350/344
[58] Field of Search ................................. 350/343, 344

[56] References Cited

U.S. PATENT DOCUMENTS

| | | |
|---|---|---|
| 1,370,974 | 3/1921 | Kirlin . |
| 2,756,467 | 7/1956 | Etling . |
| 3,535,098 | 10/1970 | Babcock . |
| 3,592,526 | 7/1971 | Dreyer ........................... 350/344 |
| 3,655,267 | 4/1972 | Forlini . |
| 3,742,600 | 7/1973 | Lowell . |
| 3,744,126 | 7/1973 | Forlini . |
| 3,912,365 | 10/1975 | Lowell ...................... 350/344 X |
| 4,148,128 | 4/1979 | Feldman ................... 350/344 X |
| 4,249,800 | 2/1981 | Spruijt ...................... 350/344 X |

FOREIGN PATENT DOCUMENTS

| | | |
|---|---|---|
| 1337552 | 11/1973 | United Kingdom . |
| 1337551 | 11/1973 | United Kingdom . |
| 1387677 | 3/1975 | United Kingdom . |
| 1402137 | 8/1975 | United Kingdom . |
| 1547148 | 6/1979 | United Kingdom . |
| 2011110 | 7/1979 | United Kingdom . |

OTHER PUBLICATIONS

Brody et al., "A 6X6 Inch 20 Lines-Per-Inch Liquid Crystal Display Panel" IEEE Transactions on Electron Devices, vol. ED-20, No. 11, Nov. 1973, pp. 995-1001.

*Primary Examiner*—John K. Corbin
*Assistant Examiner*—David Lewis
*Attorney, Agent, or Firm*—Brumbaugh, Graves, Donohue & Raymond

[57] ABSTRACT

An optical display cell of the liquid crystal type has two parallel substrates separated from each other by means of ball-shaped monodisperse particles, which are distributed homogeneously and separately across the entire area of the substrate. The dimension of an intermediate layer of liquid crystals between the substrates is, therefore, determined by the diameter of the particles. The particles are distributed across the substrate in a room, which is shielded against dust and foreign particles, by means of pressurized gas, which creates turbulence in the room. The ball-shaped particles are distributed homogeneously across the entire area of the substrate.

1 Claim, 2 Drawing Figures

U.S. Patent

Jul. 10, 1984

4,458,988

OPTICAL DISPLAY CELL AND A METHOD FOR ITS MANUFACTURING INCLUDING A GAS CLOUD WITH MONODISPHERES

The invention relates to an optical display cell and a method for its manufacture.

In optical display cells, very high demands exist as to the parallelism of the two substrates in the display cell. In optical display cells with up to 20 to 30 mm long edge lengths, the sealing device used between the substrates along the circumference of the substrates is sufficient for retaining the required degree of parallelism of the substrates. Furthermore the strength in the substrates themselves, in this order of size, will also assist in retaining the required degree of parallelism also across the surfaces of the substrates. Several methods are known for sealing the space between the substrates and maintaining the distance between them. Moreover, at the several publications also disclose methods for filling up liquid crystals in the space created by the sealing devices and the substrates.

In optical display cells with a size exceeding the above mentioned dimension, great difficulties are connected with ensuring the parallelism between the substrates by means of sealing along the circumference. Typical values for the distance between substrates in display cells with liquid crystals may be 10 $\mu$m plus or minus 5%. This distance is highly crucial for the optical efficiency of the display cell. The manufacture of optical display cells in larger sizes therefore, has been hampered due to those circumstances.

The usage of optical display cells with a size of about 8 to 10 cm and bigger, may be very advantageous and may be widespread, for example at airport and bus terminals, on buses and tramways, on railway and underground stations, etc. Optical display cells with such a size naturally also will find applications by information with changing texts, as well as bringing out visual information and also by tele-services.

To achieve the necessary parallelism between the substrates in bigger optical display cells, a connecting link between the substrates is essential in order to keep the substrates at a controlled distance from each other.

In an optical display cell according to the invention, this problem is solved by homogeneous and separate distribution of small, ball-shaped monodisperse particles across the entire area of the substrate; the thickness of the layer of liquid crystals later introduced between the substrates is determined by the diameter of the ball-shaped, monodisperse particles since the particles are homogeneous.

The manufacture of an optical display cell according to the invention is accomplished by arranging a suitable first substrate in a room that is closed off against dust and foreign particles. A gas under pressure creates a dust-cloud like turbulent environment in the room with the ball-shaped monodisperse particles swirling about in the dust-cloud. Particles settle on the substrate and after a suitable period of time are homogenously distributed across the entire area of the substrate. To control the distribution and density of the particles settling on the substrate, turbulence creating jets, which control the injection of pressurized gas, are used. Thereafter, a second substrate is arranged against the particles of the first substrate; the circumference of the substrates is sealed, and liquid crystals are filled into the space or volume defined by the sealing and the substrates, with the space between the particles being fully occupied by liquid crystals.

Figure 2:
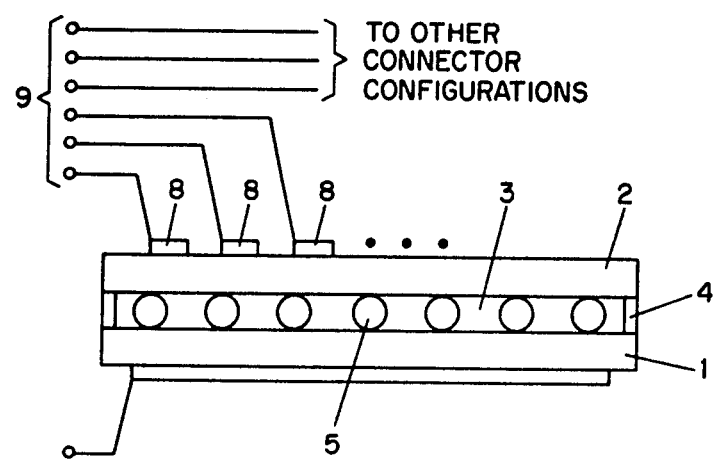

In the drawings, FIG. 1 discloses a section through a closed room for distribution of particles on a substrate, and FIG. 2 discloses a section through an optical display cell with substrates, sealing, particles and liquid crystals.

According to the method for manufacturing a unit with two parallel sheets, firstly, a suitable first substrate 1 is arranged in a room 6, closed off against dust and extraneous particles. When arranging the substrate or substrates in the room, the substrates are completely cleaned to eliminate dust. The substrate possibly initially may be placed in a chamber. In the room or chamber 6, jets 7 are arranged for injection of a gas. The gas may be air or a jet or some suitable gas, such as nitrogen or an inert gas. The jet or jets 7 are arranged so that the gas swirls at a rate sufficient to create a dust cloud of particles, some of which settle on the substrate 1 and are homogeneously distributed across the substrate area. After a sufficient amount of the particles 5 has settled on the substrate 1, the substrate is removed from the room 6, and another substrate is arranged against the particles 5 on the substrate 1, and a sealing 4 is arranged at the circumference of the substrates 1, 2. The interstice between the substrates 1, 2 thereafter is evacuated, and liquid crystals are filled into the space between the separate particles 5. The substrates initially, by a method according to the prior art, have been treated so that electrical conductor configurations 8 are formed in a way whereby definite areas of the layer of liquid crystals may be activated by creating an electrical field. Electrical connections 9 lead to the conductor configurations 8 and enable a voltage to be applied to create the electrical field.

The ball-shaped particles 5 also may be supplied to the room 6 through the turbulence creating jets 7, to create and maintain a dust-cloud shaped turbulent environment with ball-shaped particles 5 within the room 6.

An optical display cell according the invention comprises two substrates 1 and 2, connected to each other by means of a sealing 4 and kept parallel by ball-shaped monodisperse particles 5, arranged abutting the surfaces of both substrates. The distance between the substrates 1 and 2 is, therefore, homogeneous across the entire area of the substrates since particles are homogeneous. As the particles 5 are uniformly and separately distributed across the entire area of the substrate, it is possible to arrange an intermediate layer of liquid crystals with a constant thickness in the interspace 3 between the single particles 5.

The distribution and density of the particles 5 may be controlled by means of the period of time in which the substrate 1 is kept in the turbulent environment with ball-shaped particles 5.

I claim:

1. A method for manufacturing an optical display cell of the liquid crystal type with two substantially parallel substrates, of which at least one is light penetrable, an intermediate layer of liquid crystals, a peripheral seal between the substrates, and electrical connections to conductor configurations on the substrates for selectively establishing electrical fields to activate predetermined areas of the intermediate layer, comprising the steps of: arranging a suitable first substrate in a chamber shielded against dust and foreign particles, creating by means of pressurized gas a dust-cloud-like turbulent environment with ball-shaped monodisperse particles in the chamber, the particles thereby during a suitable period of time being homogeneously distributed across the entire area of the substrate, controlling the distribution and the density of the particles on the substrate by controlling injection of pressurized gas into the chamber, arranging a second substrate against the particles on the first substrate to define a space between the substrates, and sealing the periphery of the substrates with a suitable sealing means, evacuating the space between the substrates, and filling the evacuated space with liquid crystals.

* * * * *